(12) United States Patent
Payton

(10) Patent No.: US 8,401,281 B1
(45) Date of Patent: *Mar. 19, 2013

(54) METHOD AND SYSTEM FOR THREE DIMENSIONAL FEATURE ATTRIBUTION THROUGH SYNERGY OF RATIONAL POLYNOMIAL COEFFICIENTS AND PROJECTIVE GEOMETRY

(75) Inventor: Paul M. Payton, Burlingame, CA (US)

(73) Assignee: Open Invention Network, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/400,239

(22) Filed: Feb. 20, 2012

Related U.S. Application Data

(63) Continuation of application No. 12/903,295, filed on Oct. 13, 2010, now Pat. No. 8,150,146, which is a continuation of application No. 12/033,009, filed on Feb. 18, 2008, now Pat. No. 7,840,058, which is a continuation of application No. 10/689,777, filed on Oct. 20, 2003, now Pat. No. 7,343,035.

(51) Int. Cl.
*G06K 9/00* (2006.01)
(52) U.S. Cl. ........... 382/154; 382/284; 345/419; 348/42
(58) Field of Classification Search .................. 382/154, 382/284; 345/419–427; 348/42–60
See application file for complete search history.

(56) References Cited

U.S. PATENT DOCUMENTS

| | | | | |
|---|---|---|---|---|
| 6,606,404 | B1 * | 8/2003 | Zhang et al. | 382/154 |
| 6,608,923 | B1 * | 8/2003 | Zhang et al. | 382/154 |
| 6,614,429 | B1 * | 9/2003 | Zhang et al. | 345/420 |
| 6,661,913 | B1 * | 12/2003 | Zhang et al. | 382/154 |
| 7,343,035 | B1 * | 3/2008 | Payton | 382/154 |
| 7,840,058 | B2 * | 11/2010 | Payton | 382/154 |
| 8,150,146 | B1 * | 4/2012 | Payton | 382/154 |
| 2005/0128196 | A1 * | 6/2005 | Popescu et al. | 345/420 |

OTHER PUBLICATIONS

Barrett et al. "Geometric Invariants for Rational Polynomial Cameras", Applied Imagery Pattern Recognition Workshop 2000 Proceedings (29th), IEEE, 2000, pp. 223-234.*

* cited by examiner

*Primary Examiner* — Aaron W Carter
(74) *Attorney, Agent, or Firm* — Haynes and Boone, LLP

(57) ABSTRACT

A method is provided for generating height information for an arbitrary-image point on a rectified image and for generating a representation of the rectified image that includes the height information. According to an exemplary embodiment, height information is generated for an arbitrary-image point on the rectified image from first and second aerial images having respective first and second sets of rational polynomial coefficients (RPCs) and projective geometrical relationships, such that the first and second aerial images and the rectified image include overlapping image locations.

4 Claims, 7 Drawing Sheets

METHOD AND SYSTEM FOR THREE DIMENSIONAL FEATURE ATTRIBUTION THROUGH SYNERGY OF RATIONAL POLYNOMIAL COEFFICIENTS AND PROJECTIVE GEOMETRY

CROSS-REFERENCE TO RELATED APPLICATIONS

This application is a continuation of application Ser. No. 12/903,295 filed Oct. 13, 2010, now issued U.S. Pat. No. 8,150,146, which is a continuation of application Ser. No. 12/033,009 filed Feb. 18, 2008, now issued U.S. Pat. No. 7,840,058, which is a continuation of application Ser. No. 10/689,777 filed Oct. 20, 2003, now issued U.S. Pat. No. 7,343,035. Each above-identified application is incorporated by reference herein, in its entirety, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to cartography. In particular, the present invention relates to computerized techniques for extracting height information for an arbitrary-image point on an image that is mapped to a coordinate system and to generating a representation of the image that includes the height information. More particularly, embodiments of the present invention relate to computerized techniques for extracting height information for arbitrary-image points on a map given a two or more aerial images having respective sets of rational polynomial coefficients, and to generating a topographic image map that includes the extracted height information.

To locate a street, navigate a mountain trail, or target a laser guided missile, maps provide valuable information for the success of each. Relatively simple maps, such as road maps, typically provide two-dimensional (2D) flat information and forgo the inclusion of topographic information. For the automobile driver, 2D flat information, such as longitude and latitude, is often sufficient as the driver may not be terribly concerned if her path leads her up hill or down into valleys. Mountaineers, on the other hand, who propel themselves under their own power have a keen interest in knowing whether their path will traverse a landscape of steep hills and/or deep valleys. Having such interest, the mountaineer is likely to make use of a contour map having topographic information to ascertain the escarpment of their trek. Others interested in maps that include height information include fighter pilots who may require the height information for targeting and firing a missile.

Generating maps having height information often involves extraction of height information from a set of stereo photographs. The extraction of height information from stereo photographs is typically a labor intensive and costly process. For example, the extraction of height information from a pair of stereo photographs typically involves a cartographer peering through a stereoscope for an extended period of time to extract height information for points in the stereo photographs. Modern technology has done relatively little to lower the cartographer's burden with respect to extracting height information from stereo photographs. For example, while stereo photographs slowly give way to stereo digital images, the extraction of height information from stereo digital images still includes the cartographer peering through a stereoscope for extended periods of time to extract height information for points in the digitized stereo images. Instead of placing a stereoscope on a set of stereo photographs, however, cartographers now place their stereoscopes over computer monitors on which digitized stereo images are displayed or use their computers as stereo workstations.

Not only is the extraction of height information from stereo photographs and stereo digital images relatively tedious, labor intensive, and costly, the generation of relatively high quality stereo photographs and stereo digital images is also relatively costly. For example, the generation of a set of stereo digital images often requires exclusive control of a satellite for a relatively lengthy period of time. To generate a relatively high quality pair of stereo images, exclusive control of a satellite may be required for five to ten minutes or more.

Accordingly, what is needed are time efficient and low cost methods for extracting height information from a set of photographs, and for generating topographic image maps that include the extracted height information.

BRIEF SUMMARY OF THE INVENTION

The present invention provides computerized techniques for extracting height information for an arbitrary-image point on an image that is mapped to a coordinate system, and for generating a representation of the image that includes the height information. Specifically, computerized techniques are provided for extracting height information for arbitrary-image points on a map given a pair of aerial images having respective sets of rational polynomial coefficients, and for generating topographic image maps that include the extracted height information.

According to one embodiment, a computerized method is provided for generating height information for an arbitrary-image point on a rectified image from first and second aerial images having respective first and second sets of rational polynomial coefficients (RPCs), such that the first and second aerial images and the rectified image include overlapping image locations. The method includes generating, on the first aerial image, a first epipolar line and a first RPC line corresponding to the arbitrary-image point; generating, on the second aerial image, a second epipolar line and a second RPC line corresponding to the arbitrary-image point; generating a first intersection point of the first epipolar line and the first RPC line; generating a second intersection point of the second epipolar line and the first RPC; associating line and sample coordinates of the first intersection point to respective first and second cubic polynomial equations; associating line and sample coordinates of the second intersection point to respective third and fourth cubic polynomial equations; and solving the first, second, third, and fourth cubic polynomial equations to generate a height of the arbitrary-image point. According to a specific embodiment, the method further includes entering the height information on the rectified image to form a topographic image map. According to another specific embodiment, generating the first RPC line includes inserting a first set of RPCs, longitude and latitude of the arbitrary-image point, and a set of heights into cubic polynomial equations to calculate a first set of points on the first aerial image, wherein the first RPC line is a least squares linear regression fit of the first set of points. According to another specific embodiment, generating the second RPC line includes inserting a second set of RPCs, longitude and latitude of the arbitrary-image point, and a set of heights into the cubic polynomial equations to calculate a second set of points on the second aerial image, wherein the second RPC line is a least squares linear regression fit of the second set of points.

According to another embodiment, a computerized method is provided for generating height information for an arbitrary-image point on a rectified image from first and second aerial images having respective first and second sets of rational polynomial coefficients (RPCs), such that the first aerial image, the second aerial, and the rectified image include overlapping image locations. The method includes generating first and second epipolar lines on the first and second aerial images respectively; generating first and second RPC lines on the first and second aerial images, respectively; intersecting the first epipolar line and the first RPC line to generate a first match point of the arbitrary-image point; intersecting the second epipolar line and the second RPC line to generate a second match point of the arbitrary-image point; and performing stereo intersection of the first and second match points to generate the height information for the arbitrary-image point. According to a specific embodiment, the computerized method further includes entering the height information on the rectified image to form a topographic image map.

According to another specific embodiment, a computer program product is provided and is stored on a computer-readable storage medium for generating height information for an arbitrary-image point on a rectified image from first and second aerial images having respective first and second sets of rational polynomial coefficients (RPCs), such that the first and second aerial images and the rectified image include overlapping image locations. The computer program product includes code for generating a first epipolar line and a first RPC line on the first aerial image, wherein the first epipolar line and first RPC line correspond to the arbitrary-image point; code for generating a second epipolar line and a second RPC line on the second aerial image, wherein the second epipolar line and the second RPC line correspond to the arbitrary-image point; code for generating an intersection point of the first epipolar line and the first RPC line, the intersection point of the first epipolar line and the first RPC line being referred to as the first matched point; code for generating an intersection point of the second epipolar line and the second RPC line, the intersection point of the second epipolar line and the second RPC line being referred to as the second matched point; code for equating line and sample coordinates of the first matched point to respective first and second cubic polynomial equations; code for equating line and sample coordinates of the second matched point to respective third and fourth cubic polynomial equations; and code for simultaneously solving the first, second, third, and fourth cubic polynomial equations to generate a height of the arbitrary-image point. According to a specific embodiment, the computer program product further includes code for entering the height information on the rectified image to form a topographic image map.

Numerous benefits may be achieved using the present invention over conventional techniques. For example, the invention provides for extraction of height information from aerial images that need not be and/or include a stereo-image pair. In other embodiments, the invention provides for the extraction of height information using relatively low cost aerial images that include RPCs. Depending upon the specific embodiment, there can be one or more of these benefits. These and other benefits are described throughout the present specification and more particularly below.

The invention will be better understood upon reference to the following detailed description in connection with the accompanying drawings and appended claims.

DETAILED DESCRIPTION OF THE INVENTION

The present invention provides computerized techniques for extracting height information for an arbitrary-image point on an image mapped to a coordinate system and for generating a representation of the image that includes the height information. Specifically, computerized techniques are provided for extracting height information for arbitrary-image points on a map given a pair of aerial images having respective sets of rational polynomial coefficients and generating a representation of the map, such as a contour map or topographic image map that includes the extracted height information.

Figure 1:
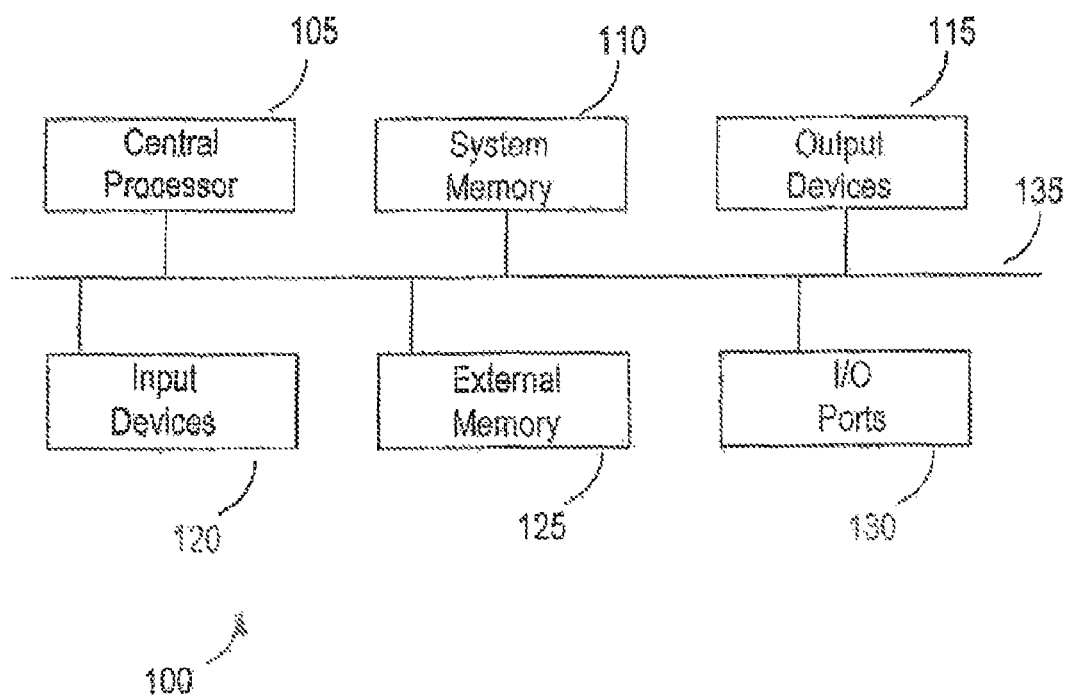
FIG. 1 is a block diagram of a computer system in which embodiments of the present invention may be implemented.

Embodiments of the present invention are best understood by first discussing mathematical constructs implemented in various embodiments, and then discussing various embodiments implementing the mathematical constructs FIG. 1 is a block diagram of a computer system 100 in which embodiments of the present invention may be implemented. According to one embodiment, computer system 100 includes a processor 105, system memory 110, a plurality of output devices 115, a plurality of input devices 120, an external memory 125, a set of input/output ports 130, and an interconnection device 135. Processor 105 may include one or a combination of a microprocessor, a microcontroller, a microcomputer, embedded logic or other processor types. System memory 110 may include EPROMs, EEPROMS, flash memories, SRAMs, DRAMs, cache memories, core memories, memory cards, such as compact flash memory, memory sticks, microdrives or the like. The plurality of output devices 115 may include a variety of output devices having a variety of output types, such as video output, audio output, tactile output, printed output, tape output or other output types. The plurality of output devices 115 may include speakers, CRTs, liquid-crystal displays, printers, computer networks, tactic feedback pointing devices and the like. The plurality of input device 120 may include a variety of inputs having a variety of input types, such as keyboards, pointing devices, digital camera and video equipment, modems, computer networks, and the like. External memory 125 may include floppy disks, hard drives, microdrives, memory cards, optical disks, such as CDs, CDRs, CDRWs, DVDs, and the like. Input/output ports 130 may be configured to communication information to other computers, computer networks, electronic devices or the like, and may include serial and/or parallel ports of various configurations. Interconnect device 135 is configured to provide a communication pathway between the modules described above (as well as other modules that may be included in computer system 100) and may be a system bus or the like. A computer software program stored on system memory 110 and/or external memory 125 is configured to generate machine code instructions, which implement embodiments of the present invention.

Figure 2:
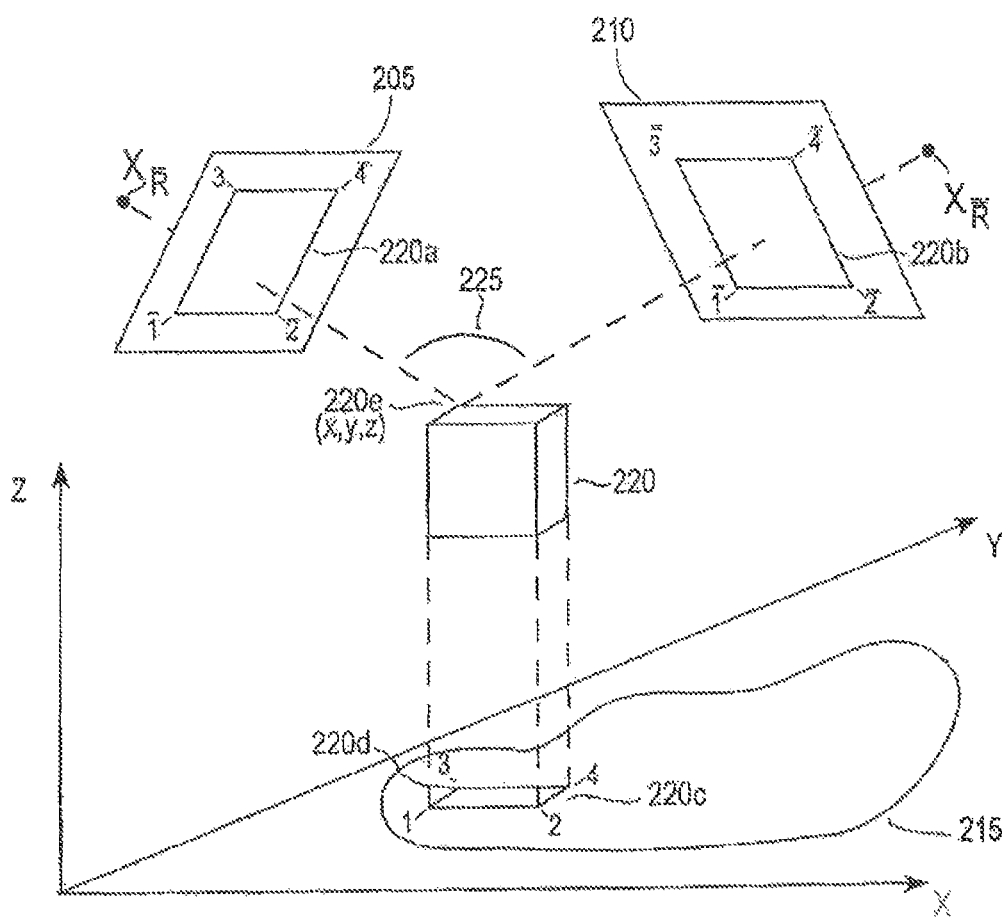
FIG. 2 is a simplified perspective view of a system that includes first and second aerial images and a rectified image, according to an embodiment of the present invention.

FIG. 2 is a simplified perspective view of a system 200 that includes first and second aerial images 205 and 210, respectively, and a rectified image 215 according to an embodiment of the present invention. Images 205, 210, and 215 may be of nearly any scene or object, such as a building, town, mountain range or other man-made or natural feature. Images 205, 210, and 215 include, for purposes of example, images 220 $a$, 220 $b$, and 220 $c$, respectively, of an object 220. Object 220 may be, for example, a building or other structure. For convenience a three dimensional perspective view of object 220 is shown and a projection of object 220 onto image 215 is also shown.

Images 205, 210, and 215 each show object 220 from unique vantage points. For example, first aerial image 205 may represent a view of object 220 from the vantage point $\bar{X}_R$, and second aerial image 210 may represent a view of object 220 from the vantage point $\bar{\bar{X}}_R$. Single bars disposed above letters designate coordinates associated with first aerial image 205, double bars disposed above letters designate coordinates associated with second aerial image 210, and the absence of bars above letters designates coordinates associated with the rectified image 215. For example, $X_R$ may designate a position at which a camera may be positioned to capture first rectified image 205 and $X_R$ may designate a position at which a camera may be positioned to capture second aerial image 210. According to one embodiment, vantage points $\bar{X}_R$ and $\bar{\bar{X}}_R$ may be separated by an angular separation 225 equal to or greater than about 10°. Vantage points $\bar{X}_R$ and $\bar{\bar{X}}_R$ typically represent oblique perspective views of an object or scene.

First and second aerial images 205 and 210 may be generated, for example, by digital image capture in a digital camera or by digitally scanning photographic images. Images 205, 210, and 215 may be stored in system memory 110 and/or external memory 125. The first and second aerial images may be a pair of stereo images. Rectified image 215 may be a digital representation of a rectified map, an orthorectified image, a digital or digitized photographic image or the like. According to one alternative, rather than a rectified image, a registered image may be used. Rectified images, in general, are planar images of a scene and are mapped (i.e., rectified) to a coordinate system, such as an UTM (universal transverse mercator) or state plane grid system. For example, rectified images may be mapped to the Earth longitude and latitude system or other coordinate system. Rectified images represent the perspective of a viewer located at essentially infinite height and looking essentially straight (i.e., perpendicularly) at a scene. Essentially infinite heights include those heights at which light reflected from a scene or object travels in essentially parallel wave fronts. As the wave fronts of the reflected light are traveling essentially parallel, the reflected light carries relatively little height information of the scene. An example of a rectified image includes a photographic image (e.g., digital photographic image) taken from an essentially infinite height (e.g., from a relatively high flying airplane or from a satellite) while viewing the photographed subject essentially straight on and then mapped to a coordinate system.

According to one embodiment, first and second aerial images 205 and 210, respectively, are associated with respective sets of rational polynomial coefficients (RPCs). RPCs and their associated cubic polynomial equations serve as closed form algebraic models for cameras, such as for classified and non-classified cameras. RPCs include, among other information, height, longitude, latitude, and camera angle of a camera used to generate an aerial image. Table 1A shows a typical set of RPCs for an aerial image. Each of the first and second aerial images is associated with a set of RPCs, such as that shown in Table 1A. Table 1B shows an organization of the RPCs in Table 1A. According to one embodiment, of interest are the last 80 fields shown in Table 1A, which include twenty line numerator coefficients, twenty line denominator coefficients, twenty sample numerator coefficients, and twenty sample denominator coefficients. "Line" and "sample" refer to coordinates of aerial images. Combinations of the last 80 fields may be inserted in cubic polynomial equations to provide an algebraic map for "back projecting" coordinates points from (latitude, longitude, height) to (line, sample). Cubic polynomial equations also provide an algebraic map for "forward projecting" coordinates from (line, sample, height) to (latitude, longitude). Table 2 shows a first cubic polynomial equation for calculating line coordinates "l" from (latitude, longitude, height) coordinates, and shows a second cubic polynomial equation for calculating sample coordinates "s" from (latitude, longitude, height) coordinates.

TABLE 1A

RPC00A/01041/1/0009.45/0000.50/002520/020504/+32.7209/
−117.1787/+0022/002520/02504/+00.0237/+000.0953/+0233/
−1.408860E+5/+3.138021E+4/−5.242870E+6/−1.124280E+4/
+4.993071E+4/−1.933386E+1/+1.249208E+4/−8.293799E+3/
−1.032206E+4/+2.972861E+1/−9.762466E+1/+7.612310E+1/
−1.401305E+1/−9.064172E−1/+2.806322E+0/−2.986934E+1/
+4.827305E+1/+6.084526E+1/−1.079136E+2/+1.081236E−1/
+5.028277E+6/−4.782329E+4/+9.889799E+3/−1.627677E+4/
+1.370841E+1/+1.187620E+2/+9.510398E+1/−2.073721E+1/
+2.863694E+1/−3.607049E+1/+3.194600E−2/+7.436759E−3/
+1.736116E−4/−4.68698E−2/−2.630614E−2/+5.674005E−3/
−6.575810E−2/−1.290405E−2/+5.606167E−2/+2.800695E−2/
−1.520871E+6/+5.242870E+6/−3.885892E+2/−2.823476E+4/
+8.871593E+3/−1.465072E+4/+5.515903E+1/−4.972630E+4/
−2.709035E+0/+1.071866E+2/+1.062780E+2/−2.050115E+1/
+2.660789E+1/−4.389676E+1/+2.740518E+1/+1.385559E−2/
9.790713E−141.012999E+2/+1.909722E−2/+2.625372E−1/
+1.465950E+6/−1.394246E+4/+2.883284E+3/−4.745350E+3/
+3.996566E+0/+3.462402E+1/+2.772673E+1/−6.045752E+0/
+8.348848E+0/−1.051604E+1/+9.313574E−3/+2.168122E−3/
+5.061495E−5/−1.366448E−2/−7.669325E−3/+1.654206E−3/
−1.917120E−2/−3.762063E−3/+1.634429E−2/+8.165181E−3/

TABLE 1B success (reject 0 or success 1)
error -- bias (0.0 to 6553.5)
error -- random (0.0 to 6553.5)
line offset (0 to 524287)
sample offset (0 to 54144)

TABLE 1B-continued geodetic latitude offset (−90.0 to +90.0)
geodetic longitude offset (−180.0 to +180.0)
geodetic height offset (−8096 to +8096)
line scale (0 to 524287)
sample scale (0 to 54144)
geodetic longitude scale (−90.0 to +90.0)
geodetic latitude scale (−180.0 to 180.0)
geodetic height scale (−8096 to +8096)
twenty line numerator coefficients
twenty line denominator coefficients
twenty sample numerator coefficients
twenty sample denominator coefficients

TABLE 2

$1 = (a_0 + a_1x + a_2y + a_3z + a_4x^2 + a_5y^2 + a_6z^2 + a_7xy + a_8xz + a_9yz + a_{10}x^3 + a_{11}y3 + a_{12}z^3 + a_{13}x^2y + a_{14}xy^2 + a_{15}x^2z + a_{16}xz^2 + a_{17}y^2z + a_{18}yz^2 + a_{19}xyz)/(b_0 + b_1x + b_2y + b_3z + b_4x^2 + b_5y^2 + b_6z^2 + b_7xy + b_8xz + b_9yz + b_{10}x^3 + b_{11}y^3 + b_{12}z^3 + b_{13}x^2y + b_{14}xy^2 + b_{15}x^2z + b_{16}xz^2 + b_{17}y^2z + b_{18}yz^2 + b_{19}xyz)$ $s = (c_0 + c_1x + c_2y + c_3z + c_4x^2 + c_5y^2 + c_6z^2 + c_7xy + c_8xz + c_9yz + c_{10}x^3 + c_{11}y^3 + c_{12}z^3 + c_{13}x^2y + c_{14}xy^2 + c_{15}x^2z + c_{16}xz^2 + c_{17}y^2z + c_{18}yz^2 + c_{19}xyz)/(d_0 + d_1x + d_2y + d_3z + d_4x^2 + d_5y^2 + d_6z^2 + d_7xy + d_8xz + d_9yz + d_{10}x^3 + d_{11}y^3 + d_{12}z^3 + d_{13}x^2y + d_{14}xy^2 + d_{15}x^2z + d_{16}xz^2 + d_{17}y^2 + d_{18}yz^2 + d_{19}xyz)$ RPCs $a_0$-$a_{19}$ are line numerator coefficients, RPCs $b_0$-$b_{19}$ are line denominator coefficients, RPCs $c_0$-$c_{19}$ are sample numerator coefficients, and RPCs $d_0$-$d_{19}$ are sample denominator coefficients.

According to one embodiment, height information of an arbitrary image point 220 *d* (having coordinates (p,q)) is extracted from first and second aerial images 205 and 210, respectively, and rectified image 215. Arbitrary image point 220 *d* is a point in rectified image 215 of shape 220 *c*. Arbitrary image point 220 *d* corresponds to an arbitrary object point 220 *e* on object 220. Arbitrary object point 220 *e* may be, for example, a corner of a building or other object. Height information for arbitrary-image point 220 *d* may be used, for example, to generate a representation of the rectified image that includes the height information.

The following discussion describes extraction of height information for arbitrary-image point 220 *d*. For purposes of example the following discussion focuses on generation of height information for arbitrary-image point 220 *d*; however, the techniques discussed may be applied to nearly any arbitrary point on rectified image 215. According to one embodiment, eight or more sets of conjugate points are selected from the first and second aerial images and the rectified image. A set of conjugate points includes a point from each of the first aerial image, the second aerial image, and the rectified image that represents the same locations in each of the images. For convenience, four sets of conjugate points are shown in images 205, 210, and 215 and are labeled (1, 1, 1), (2, 2, 2), (3, 3, 3), and (4, 4, 4). Each conjugate point includes a set of coordinates that locate the conjugate point in its respective image. For example, conjugate points 3, 3, and 3 may have coordinates $(p_3,q_3)$, $(p_3, q_3)$, and $(p_3, q_3)$, respectively.

From the eight or more sets of conjugate points, a first fundamental matrix and a second fundamental matrix are generated. Fundamental matrices relate points in rectified images to points in aerial images. Table 3 below shows a first fundamental matrix that relates points in rectified image 215 to points in first aerial image 205. Table 4 below shows a second fundamental matrix that relates points in rectified image 215 to points in second aerial image 210

TABLE 3

$$\begin{bmatrix} \overline{p_i} \\ \overline{q_i} \\ 1 \end{bmatrix} = \begin{bmatrix} e_1 & e_2 & e_3 \\ e_4 & e_5 & e_6 \\ e_7 & e_8 & 1 \end{bmatrix} [p_i \quad q_i \quad 1]$$

TABLE 4

$$\begin{bmatrix} \overline{\overline{p_i}} \\ \overline{\overline{q_i}} \\ 1 \end{bmatrix} = \begin{bmatrix} f_1 & f_2 & f_3 \\ f_4 & f_5 & f_6 \\ f_7 & f_8 & 1 \end{bmatrix} [p_i \quad q_i \quad 1]$$

Sets of conjugate points from which the fundamental matrices are generated may be computer generated. Techniques for generating fundamental matrices from a set of conjugate points are well known by those of skill in the art and will not be discussed in detail.

According to one embodiment, a longitude "x" and a latitude "y" are generated for coordinates p and q, respectively, of arbitrary-image point 220 *d*. In general, linear relationships relate longitude and latitude to the coordinates of image points in rectified image 215, for example, $x=\alpha_1 p+\beta_1 q$ and $y=\alpha_2 p+\beta_2 q$. Generating longitude x and latitude y from point (p,q) 220 *d* serves to locate point (p,q) 220 *d* on the surface of the Earth or on a WGS-84 ellipsoid, which represent a mathematical model of the Earth's surface. Longitude x and latitude y may be normalized to ranges of −1 to +1 to generate a normalized longitude $x_n$ and a normalized latitude $y_n$. Normalizing the longitude and latitude provides that in subsequent calculations (discussed below) that employ RPCs and their associated cubic polynomial equations, round off errors generated by computer 100 may be relatively reduced. Reducing round off error provides relatively accurate height information and corresponding provides relatively accurate topographic image maps that include the height information.

Figure 3:
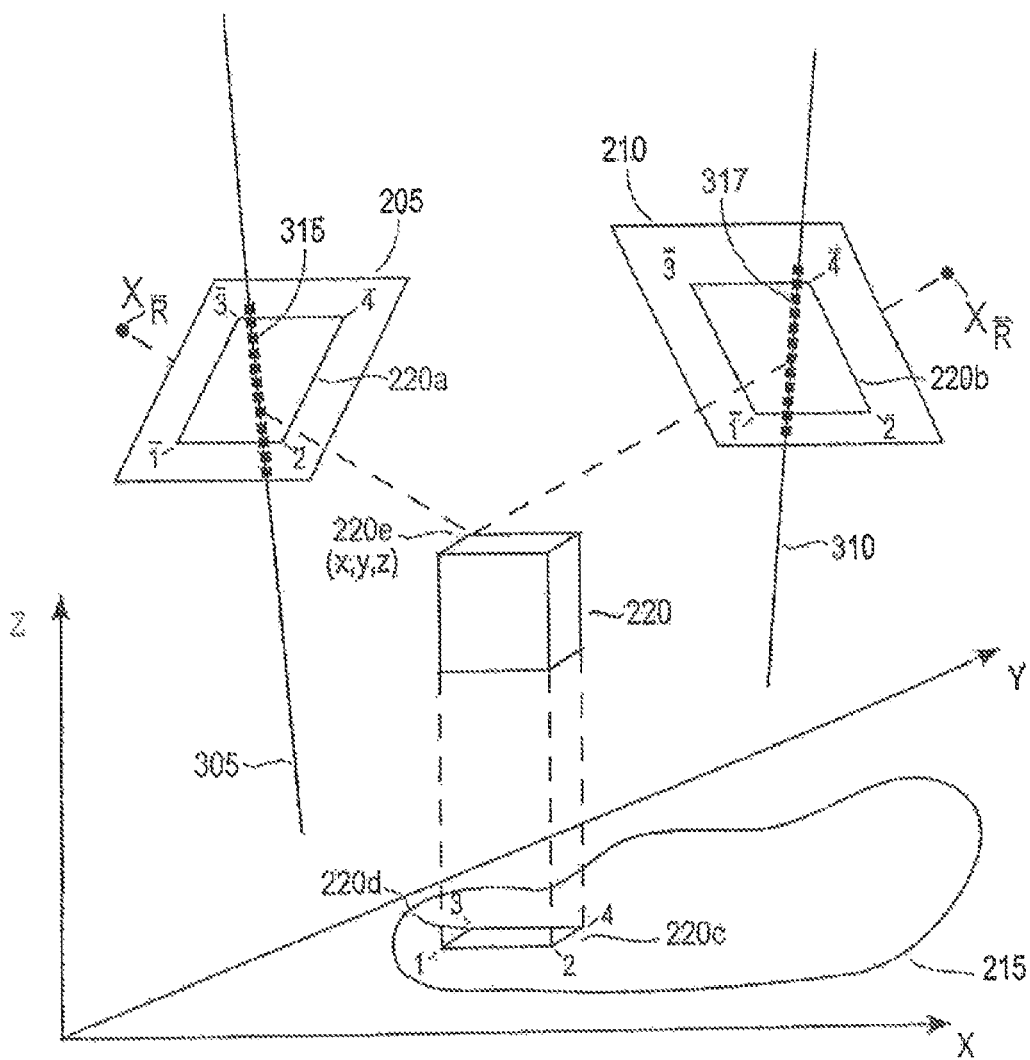
FIG. 3 is a simplified perspective view of the system including first and second RPC lines projected in first and second aerial images, respectively, according to another embodiment of the present invention.

According to one embodiment, a first RPC line 305 is generated in first aerial image 205 (see FIG. 3). To generate first RPC line 305, the normalized longitude $x_n$ and the normalized latitude $y_n$ are entered into cubic polynomial equations for line "1" and sample "s", such as those shown in Table 2. The cubic polynomial equations include RPCs associated with first aerial image 205. A set of heights $(z_1, z_2, \ldots z_N)$ is selected that may represent heights above and below a zero height on the Earth's surface or above and below a zero height of a WGS-84 ellipsoid. Each $z_N$ is entered in the cubic polynomial equation to generate a set of (line, sample) points $(p_1,q_1), (p_2,q_2) \ldots (p_N,q_N)$ 315. First RPC line 305 is a least squares linear regression fit to the set of points 315.

Similar to generation of first RPC line 305, a second RPC line 310 is generated in second aerial image 210. To generate second RPC line 310, the normalized longitude $x_n$ and normalized latitude $y_n$ are entered into cubic polynomial equations for line "1" and sample "s". The cubic polynomial equations include RPCs associated with second aerial image 210. Each ZN in the set of heights $(z_1, z_2, \ldots z_N)$ is entered in the cubic polynomial equations to generate a set of (line, sample) points $(p_1,q_1) \ldots (p_2,q_2) \ldots (p_n,q_N)$ 317. Second RPC line 310 is a least square linear regression fit to the set of points 317.

First RPC line 305 represents predicted locations along which normalized longitude $x_n$, normalized latitude $y_n$ and selected heights $z_N$ are observed in first aerial image 205, and second RPC line 310 represents predicted locations along which normalized longitude $x_n$, normalized latitude $y_n$ and selected heights $z_N$ are observed in second aerial image 210. To localize the position on the first and second RPC lines at which the arbitrary-image point 220 $d$ (p,q) is located, epipolar lines are projected in the first and second aerial images and are intersected with the RPC lines. The intersections point of the RPC lines and epipolar lines represent the locations of arbitrary-image point 220 $d$ (p,q) in the aerial images. Epipolar line generation and line intersection are presently discussed and described in further detail.

Figure 4:
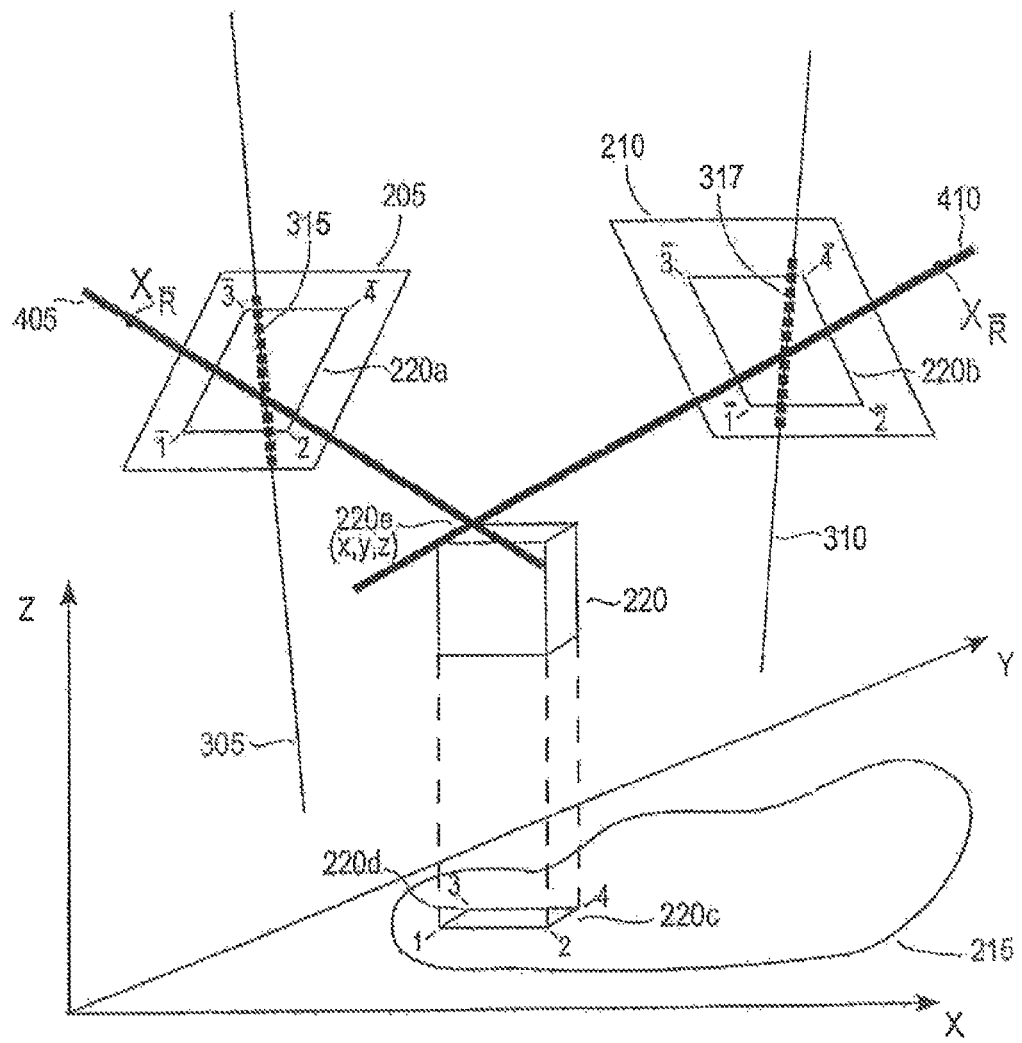
FIG. 4 is a simplified perspective view of the system including first and second epipolar lines projected in the first and second aerial images, respectively, according to another embodiment of the present invention.

According to one embodiment, first and second epipolar lines 405 and 410, respectively, are generated, (see FIG. 4). The first epipolar line 405 is projected in the first aerial image 205 and the second epipolar line 410 is projected in the second aerial image 210. First epipolar line 405 is generated from the fundamental matrix relationship shown in Table 3. Coordinates (p,q) for arbitrary-image point 220 $d$ are entered in fundamental matrix relationship as shown in Table 5.

TABLE 5

$$\begin{bmatrix} \bar{p} \\ \bar{q} \\ 1 \end{bmatrix} = \begin{bmatrix} e_1 & e_2 & e_3 \\ e_4 & e_5 & e_6 \\ e_7 & e_8 & 1 \end{bmatrix} [p \ q \ 1]$$

The fundamental matrix relationship defines first epipolar line 405. The fundamental matrix relationship may be recast as: E p+F q+G=0, such that E, F, and G are products of the matrix elements and coordinates (p,q). Second epipolar line 410 is generated from the fundamental matrix relationship shown in Table 4. Coordinates (p,q) for arbitrary-image point 220 $d$ are entered in fundamental matrix relationship as shown in Table 6.

TABLE 6

$$\begin{bmatrix} \bar{p} \\ \bar{q} \\ 1 \end{bmatrix} = \begin{bmatrix} f_1 & f_2 & f_3 \\ f_4 & f_5 & f_6 \\ f_7 & f_8 & 1 \end{bmatrix} [p \ q \ 1]$$

The fundamental matrix relationship defines second epipolar line 410. The fundamental matrix relationship may be recast as: H p+I q+J=0, such that H, I, and J are products of the matrix elements and coordinates (p,q).

Figure 5:
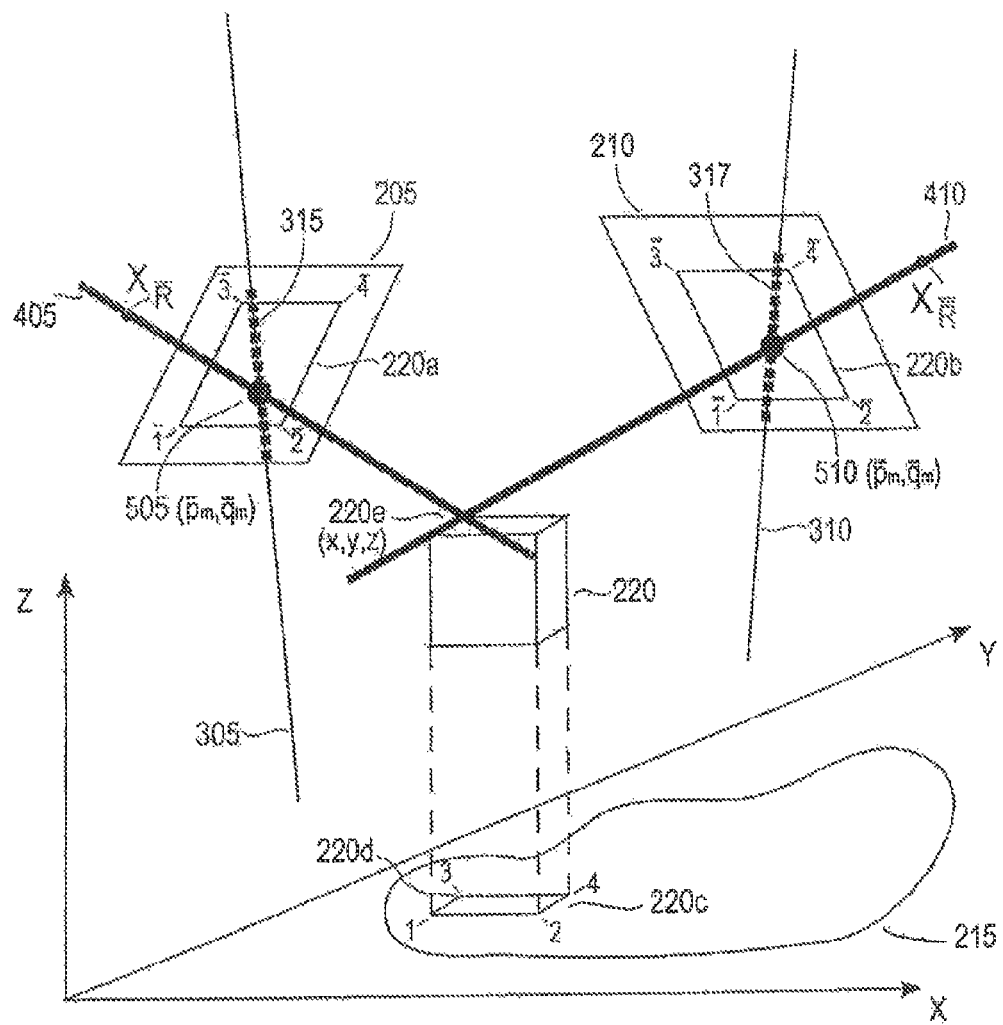
FIG. 5 is a simplified perspective view of the system including a first match point ($p_m$, $q_m$) in the first aerial image and a second match point ($p_m$, $q_m$) in the second aerial image according to another embodiment of the present invention.

According to one embodiment, a first match point ($p_m$, $q_m$) 505 in the first aerial image 205 is generated that matches the location of arbitrary-image point (p,q) 220 $d$ in rectified image 215, and a second match point ($p_m$, $q_m$) 510 in the second aerial image 210 is generated that matches the location of arbitrary-image point (p,q) 220 $d$ in rectified image 215, (see FIG. 5). The first match point ($p_m$, $q_m$) 505 is the intersection point of the first RPC line 305 and the first epipolar line 405, and the second match point ($p_m$, $q_m$) 510 is the intersection point of the second RPC line 310 and the second epipolar line 410. Techniques for generating intersection points of straight lines are well know by those of skill in the art and will not be discussed in detail.

Figure 6:
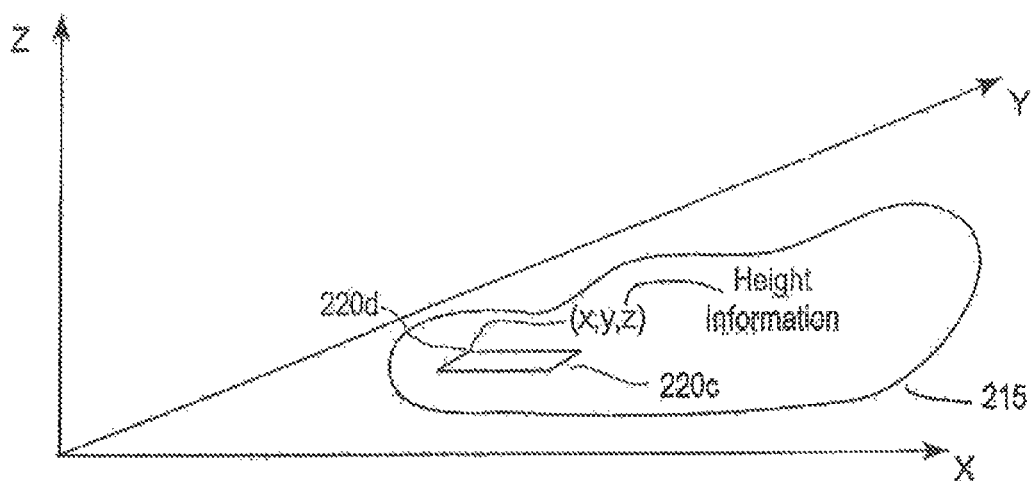
FIG. 6 is a simplified perspective view of a representation of the rectified image including height information according to an embodiment of the present invention.

Subsequent to generation of the first match point ($p_m$, $q_m$) 505 and the second match point ($p_m$, qm) 510, the line and sample of the first match point ($p_m$, $q_m$) 505 are set equal to cubic polynomial equations, such as those shown in Table 2, having RPCs for the first aerial image 205. Similarly, the line and sample of the second match point ($p_m$, $q_m$) 510 are set equal to cubic polynomial equations having RPCs for the second aerial image 210. The four cubic polynomial equations for $p_m$, $q_m$, $p_m$, and $q_m$ are simultaneously solved to generate longitude x, latitude y, and height z for arbitrary-image point 220 $d$. Techniques for simultaneously solving the four cubic polynomial equations include iterative partial derivatives techniques, which are well understood by those of skill in the art and will not be discussed in detail. Alternatively, stereo intersection may be performed on match points $p_m$, $q_m$, $p_m$, and $q_m$ to generate longitude x, latitude y, and height z for arbitrary-image point 220 $d$. Stereo intersection is well understood by those of skill in the art and will not be discussed in detail. Height z for arbitrary-image point 220 $d$ may then be indicated on rectified image 215 to generate a representation of the rectified image, which includes height z, (see FIG. 6). Height z may be designated numerically, with color codes, added to a contour line or the like. Those of skill in the art will known of other techniques for designating height.

Figure 7:
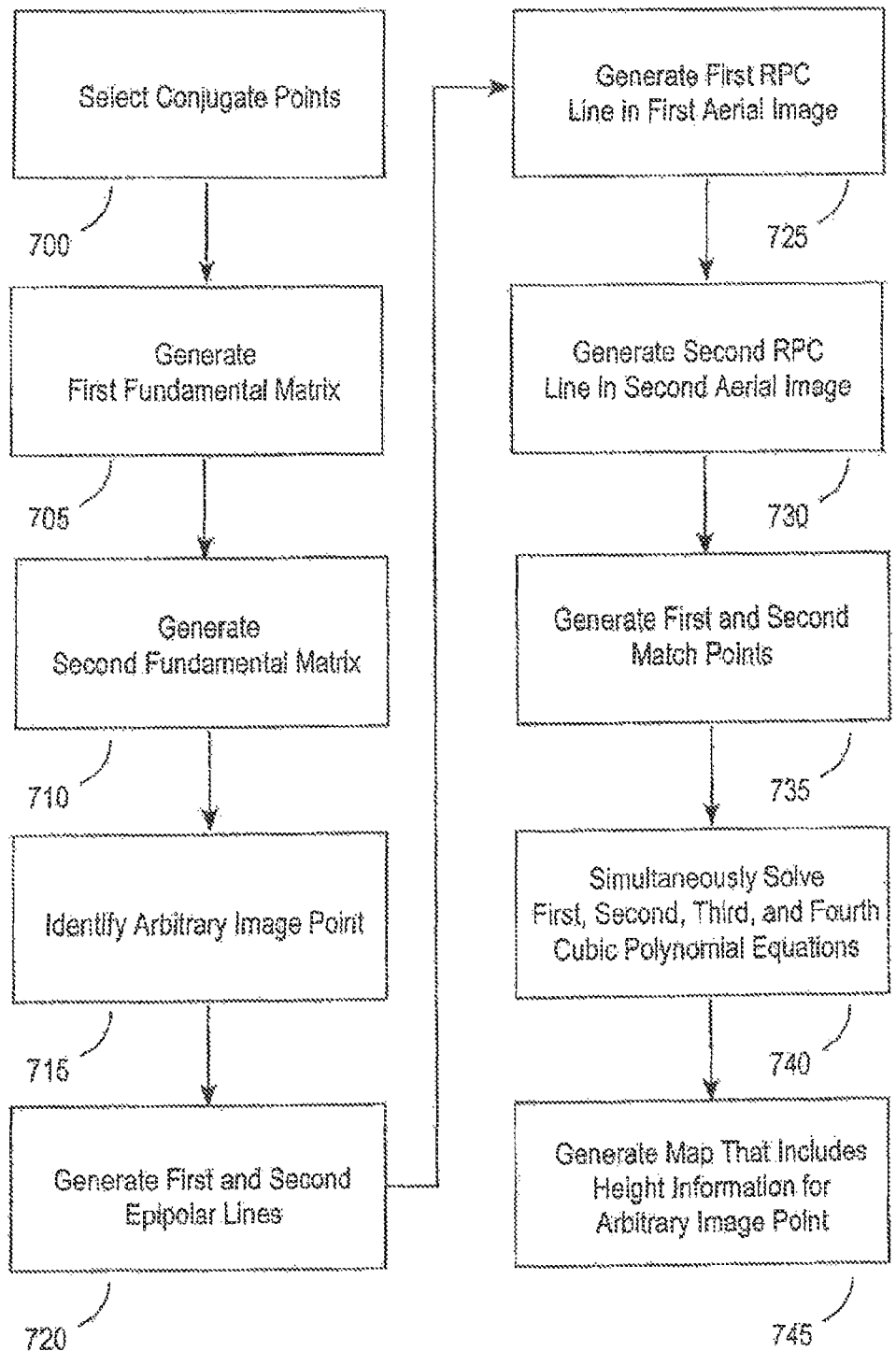
FIG. 7 is a high level flow chart illustrating steps for generating rectified images, such as maps, that include height information for arbitrary-image points in a rectified image according to an embodiment of the present invention.

FIG. 7 is a high level flow chart illustrating steps for generating rectified images, such as maps, that include height information for arbitrary-image points in the rectified image. It should be realized that the steps shown in FIG. 7 are not limiting on the invention as recited in the claims, but are illustrative of an exemplary embodiment. Other techniques having fewer, substitute, and/or additional steps are within the purview of the invention and will be readily apparent to those of skill in the art after having read the specification in view of the drawings. At 700, at least eight conjugate points are selected from a first aerial image, a second aerial image, and a rectified image. At 705, a first fundamental matrix is generated that relates points in the rectified image to points in the first aerial image. At 710, a second fundamental matrix is generated that relates points in the rectified image to points in the second aerial image. At 715, an arbitrary-image point in the rectified image is identified for which height information is to be generated. According to one embodiment, the image point is mapped to associated longitude and latitude coordinates, which may be normalized within a range of −1 to 1. At 720, a first epipolar line is generated in the first aerial image from the first fundamental matrix and the arbitrary-image point, and a second epipolar line is generated in the second aerial image from the second fundamental matrix and the arbitrary-image point. At 725, a first RPC line is generated in the first aerial image and at 730, a second RPC line is generated in the second aerial image. The first RPC line may be generated from the entry of the normalized longitude and the normalized latitude into cubic polynomial equations having RPCs for the first aerial image. The second RPC line may be generated from entry of the normalized longitude and the normalized latitude into cubic polynomial equations having RPCs for the second aerial image. At 735, a first match point (i.e., intersection point) of the first epipolar line and the first RPC line is generated, and a second match point (i.e., intersection point) of the second epipolar line and the second RPC line is generated. At 740, line and sample coordinates of the first match point are set equal to respective first and second cubic polynomial equations that include RPCs for the first aerial image. Similarly, line and sample coordinates of the second match point are set equal to respective third and forth cubic polynomial equations that include RPCs for the second aerial image. The first, second, third, and fourth cubic polynomial equations are simultaneously solved to generate longitude, latitude, and height of the arbitrary-image point. At 745, the height of the image point is entered onto the rectified image to generate a representation of the rectified image having the height information. The preceding steps may be repeated for a number of arbitrary-image points in the rectified image to generate, for example, a contour map or other topographic image map that includes height information of the number of arbitrary-image points.

It is to be understood that the examples and embodiments described above are for illustrative purposes only and that various modifications or changes in light thereof will be suggested to persons skilled in the art and are to be included within the spirit and purview of this application and scope of the appended claims. For example, while embodiments have been characterized as including steps to normalize longitude and latitude of an arbitrary-image point, the longitude and latitude need not be normalized to generate height information for the arbitrary-image point. Therefore, the above description should not be taken as limiting the scope of the invention as defined by the claims.

The invention claimed is:

1. A computerized method for generating height information for an arbitrary-image point on a rectified image from first and second aerial images having respective first and second sets of rational polynomial coefficients (RPCs), the first aerial image, the second aerial image, and the rectified image including overlapping image locations, the method comprising:

generating first and second epipolar lines on the first and second aerial images respectively;

generating first and second RPC lines on the first and second aerial images, respectively;

determining a plurality of match points based on the first epipolar line, the first RPC line, the second epipolar line and the second RPC line; and generating height information based for the arbitrary-image point based on the plurality match points.

2. The computerized method of claim 1 further comprising entering the height information on the rectified image to form a topographic image map.

3. A tangible computer readable storage medium containing a software program for generating height information for an arbitrary-image point on a rectified image from first and second aerial images having respective first and second sets of rational polynomial coefficients (RPCs), the first aerial image, the second aerial image, and the rectified image including overlapping image locations, the storage medium comprising:

computer program code for generating first and second epipolar lines on the first and second aerial images respectively;

computer program code for generating first and second RPC lines on the first and second aerial images, respectively; computer program code for determining a plurality of match points based on the first epipolar line, the first RPC line, the second epipolar line and the second RPC line; and computer program code for generating height information based for the arbitrary-image point based on the plurality match points.

4. The storage medium of claim 3 further comprising computer program code for entering the height information on the rectified image to form a topographic image map.

* * * * *